Oct. 11, 1932.  W. G. HARTWIG  1,881,547
THERMOSTAT
Filed March 29, 1929   4 Sheets-Sheet 1
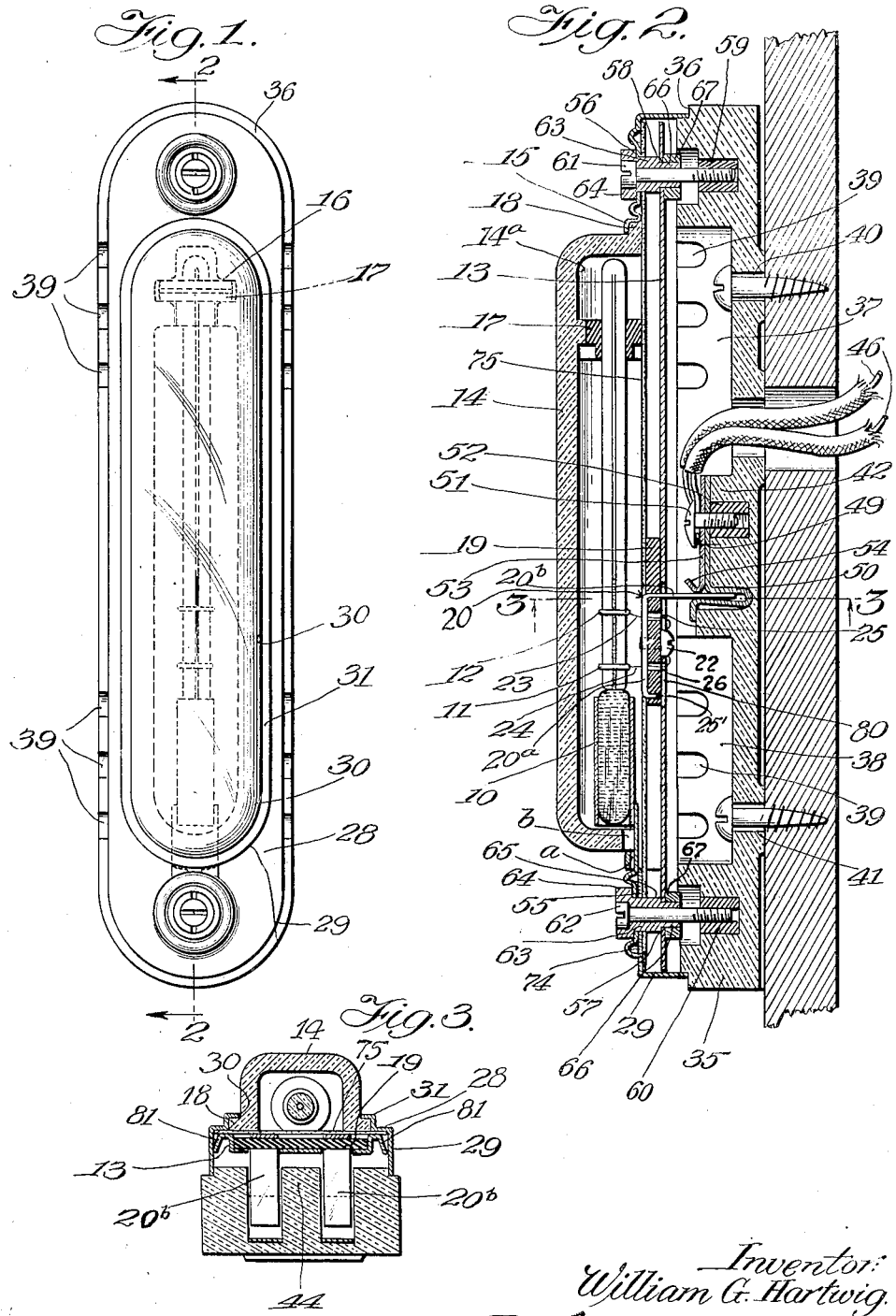
Inventor:
William G. Hartwig.
By Rector Hibben Davis and Macaulay
his Attys.

Oct. 11, 1932. W. G. HARTWIG 1,881,547
THERMOSTAT
Filed March 29, 1929 4 Sheets-Sheet 2
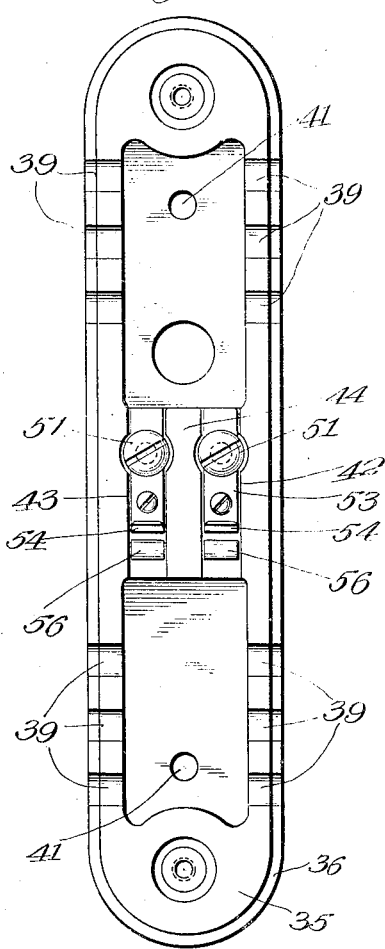
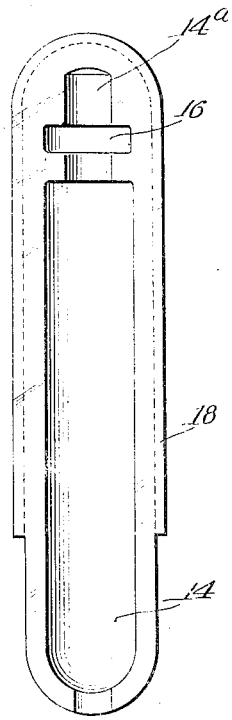
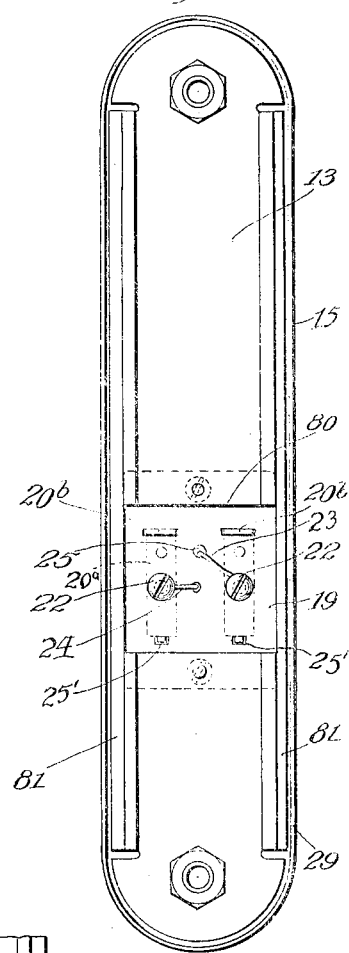
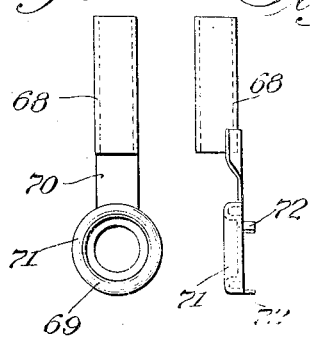
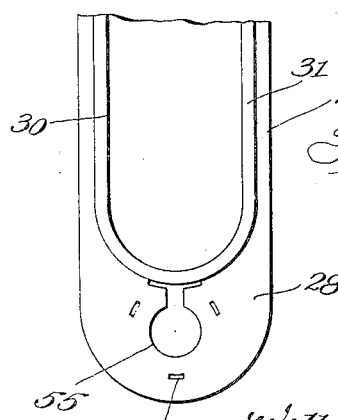
Inventor:
William G. Hartwig.

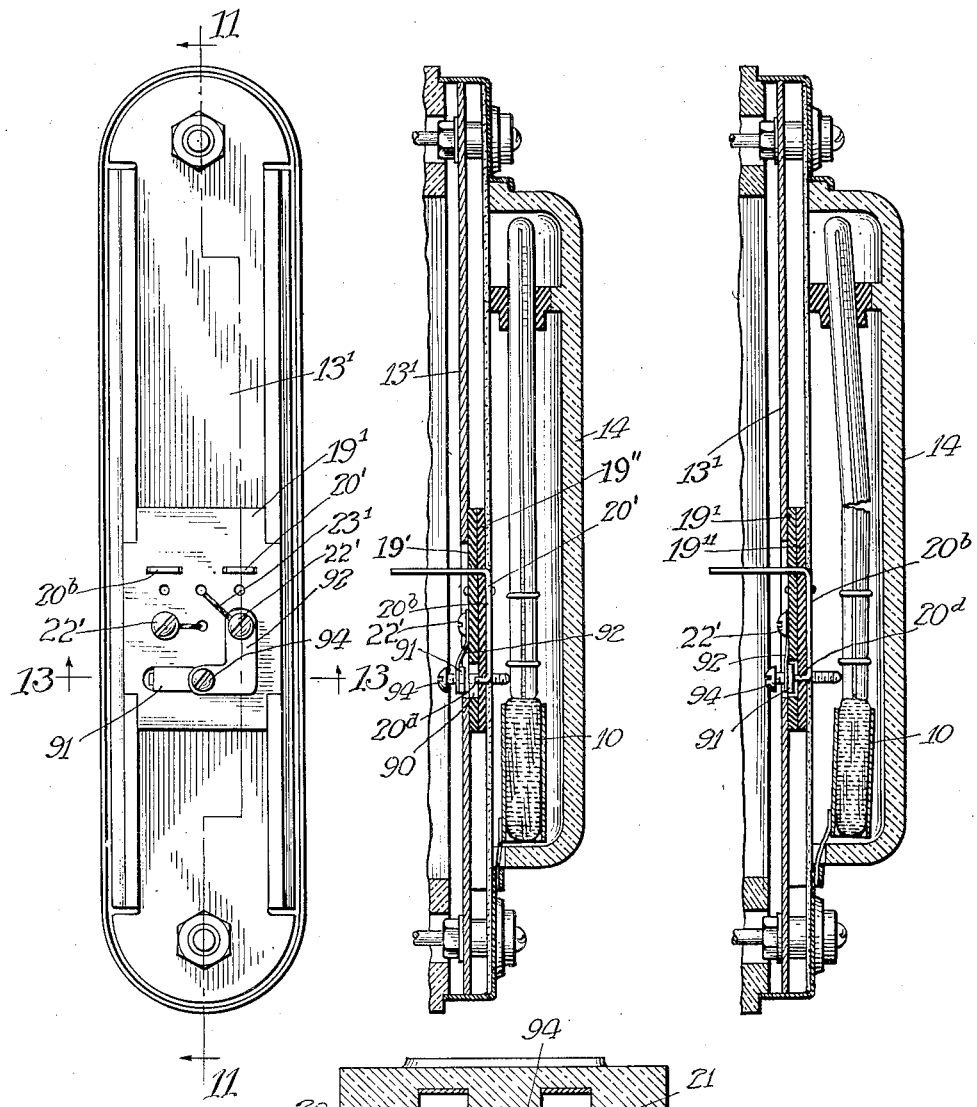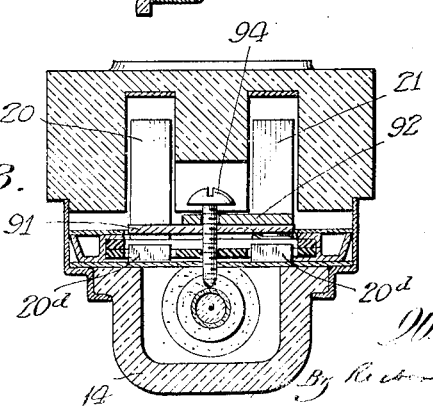

Oct. 11, 1932. W. G. HARTWIG 1,881,547
THERMOSTAT
Filed March 29, 1929  4 Sheets-Sheet 4

Inventor
William G. Hartwig
By
Attorneys

Patented Oct. 11, 1932

1,881,547

UNITED STATES PATENT OFFICE

WILLIAM G. HARTWIG, OF CHICAGO, ILLINOIS, ASSIGNOR TO RAILWAY UTILITY COMPANY, OF CHICAGO, ILLINOIS, A CORPORATION OF ILLINOIS

THERMOSTAT

Application filed March 29, 1929. Serial No. 351,020.

My invention relates more particularly to mountings for thermostats of the thermometer type commonly employed to maintain an equable temperature in street cars and other enclosures heated electrically or in which the heating means is electrically controlled. It provides a device of this character in which the thermostat is mounted in the hollow of a glass or other transparent cover, so that it is well protected against injury and is visible throughout a wide angle and for its entire length so that in case of breakage the break is readily detected. My improved mounting moreover is such that with the aid of a screw-driver or the like the thermostat and the electrical connections are readily accessible. Furthermore, my invention provides a thermostat which is thoroughly protected against tampering or injury and at the same time is exceptionally sensitive to small variations of temperature within the car or compartment the temperature of which is to be controlled thereby. In the preferred form of the invention, moreover, means is provided for closing the circuit automatically in case the thermostat should be broken and thereby shutting off the heat. Other advantages and features of invention will be apparent from the detailed description and the following claims.

Referring to the drawings accompanying and forming a part of this specification, Figure 1 is a face view of a thermometer-thermostat and mounting embodying my invention except for the means for closing the circuit in case of the breaking of the thermostat;

Fig. 2 is a vertical longitudinal section of the same on the line 2—2 of Fig. 1, parts being shown in elevation;

Fig. 3 is a transverse section on the plane of the line 3—3 of Fig. 2;

Fig. 4 is a face view of the base of the device;

Fig. 5 is a rear view of the cover member of the device;

Fig. 6 is a rear view of the back plate of the device;

Figs. 7 and 8 are front and side views respectively of a detail;

Fig. 9 is a face view of a portion of one of the members of the device;

Figure 14:
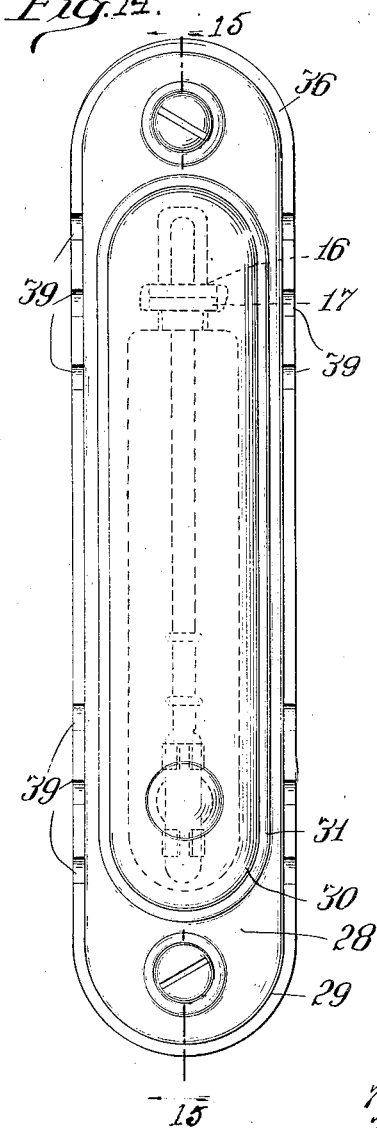
Figure 15:
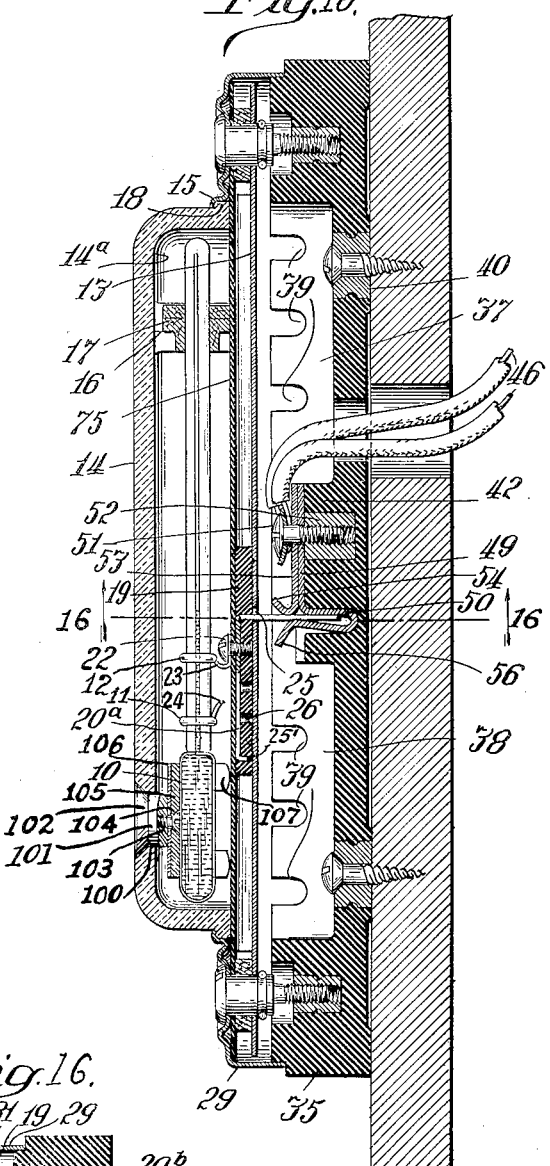

Figs. 10 to 13 inclusive, show the preferred form of the invention in which is incorporated the automatic means for closing the circuit in the event that the thermostat tube is broken;

Fig. 10 being a rear view of the back of the casing;

Fig. 11 a vertical section on the broken line 11—11 of Fig. 10;

Fig. 12 a view similar to Fig. 11 but showing the thermostat tube broken and the automatic circuit closer closed; and Fig. 13 a transverse horizontal section on the line 13—13 of Fig. 10;

Fig. 14 is a view in front elevation of another form of thermostat embodying my invention;

Fig. 15 a vertical section thereof on the plane of line 15—15 of Fig. 14; and

Figure 16:
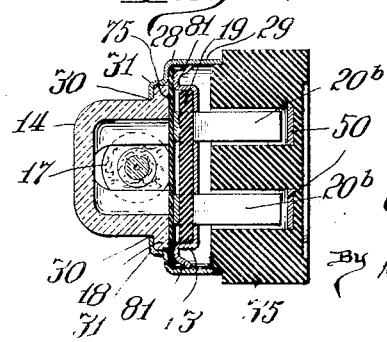

Fig. 16 a horizontal section therethrough on the plane of line 16—16 of Fig. 15.

Each part is identified by the same reference symbol wherever it occurs in the several views.

Referring first to that form of the invention shown in Figs. 1 to 9, inclusive, the thermostat proper or heat sensitive element 10 may be and is shown as of a well-known form having the usual mercury bulb and column with two wire contacts 11, 12, adapted, when the mercury in the tube rises to or above contact 12, to close an electric circuit comprising said contacts. The thermostat is mounted in a hollow oblong cover 14 of transparent material, preferably glass, which may be cast or molded into the required shape. The cover is cast with a marginal flange 18 extending about the upper portion of the edge thereof for cooperation with the frame, hereinafter described, for holding the cover and other parts of the apparatus in proper relation with each other. The upper end 14ᵃ of the hollow of the cover is of reduced cross-section and a transverse groove 16 is formed therewith, see Fig. 5, to receive a rubber collar 17. The collar 17 is of a thickness to be frictionally held within the groove and support the thermostat which is thrust therethrough as plainly shown in Fig. 2.

The rear opening of the cover is substantially closed by a back 13 which may be made of metal or other suitable material. The back plate and cover are held in proper relative positions by a frame 15, here shown as made of sheet metal which surrounds their edges. The frame comprises a face plate 28 and a rearwardly extending flange 29, the back plate 13 fitting loosely within this flange. An aperture 30 adapted to fit about the body of the cover is formed in the face plate 28, and the face plate is struck up outwardly about said opening to form a recessed seat or rabbet 31 to receive the outwardly extending flange 18 of the cover referred to above. When the parts are assembled the cover is inserted in said aperture from the rear and protrudes therethrough, as best shown in Figs. 2 and 3 so that the thermostat is visible through a horizontal angle of approximately 180 degrees.

The casing comprising the back plate, cover, and frame is mounted upon a base 35 provided with holes 40, 41 for the reception of screws to secure said base to a panel of a car or other support. As it is important in the interest of sensitiveness to the temperature of the atmosphere of the car or other enclosure in which the thermostat is located to minimize heat transfer from the support to the instrument, the face of the base is recessed at 37, 38 intermediate the ends, and the walls of the recess so formed are perforated or notched as at 39, to permit circulation of air behind the back plate 13. The face plate of the frame and the back plate are perforated at their respective opposite ends as at 55, 56, 57, 58, the holes in the upper ends of these elements being in registry and the holes at the lower ends of these elements also being in registry, and interiorly threaded sleeves or nuts 59—60 are similarly located in the ends of the base. The holes in the frame are somewhat larger than those in the back plate for the reception of sleeves 63 by means of which the frame and back plate are held together. As best seen in Fig. 2, each of these sleeves has a head 64 of larger diameter than the hole in the frame, a body 65 fitting within the hole in the frame and a reduced end 66 fitting within the hole in the back plate. A nut or collar 67 on the reduced end of the sleeve holds the back plate against the shoulder of the body portion of the sleeve. Screws 61, 62 extend through the respective sleeves and are threaded into nuts 59, 60 respectively for securing the casing to the base.

In order that the thermometer may respond sensitively to the changes in temperature of the atmosphere of the car or other compartment, the temperature of which is to be regulated, I provide the heat conductor, best seen in Figs. 2, 7 and 8, which is formed with a sleeve 68 surrounding and in close contact with the bulb of the thermostat, a struck up ring 69 and an intermediate connection 70, the whole preferably being formed of sheet metal of high conductivity, as for example, copper or silver. The ring 69 surrounds the sleeve 63 at the lower end of the instrument beneath the head 64 and is thus secured in position. As specifically shown, the ring is formed with an annular corrugation 71 which is exposed to the atmosphere of the car or other compartment to respond to changes in the temperature thereof. The ring may be further anchored in place by providing the edges thereof with small tongues 72, which, when the device is assembled, extend through slots 73 in the face plate of the frame. It is desirable in the interest of sensitiveness that the heat conductor just described be insulated from the frame and for this purpose a small washer 74 of felt or the like may be inserted under the heat conductor and between the same and the frame. When the device is assembled the intermediate portion of the heat conductor extends through an opening $a$ in the raised inner edge of the frame and beneath a notch $b$ in the edge of the glass cover.

As a further protection against the transfer of heat to the thermostat, I prefer to insert a strip of felt 75 of substantially the dimensions and shape of the back plate between the latter and the thermostat, forming holes therein for the reception of the screws with their surrounding sleeves.

In order to connect the contacts 11—12 to the electric circuit which the thermostat controls, I connect said contacts with connectors mounted on the back, which connectors enter sockets on the base, to which sockets the respective lead wires of the electric system control are connected. For this purpose the back plate 13 is cut away at 80 intermediate the spacing ribs 81—81 struck up from the edge metal of the back plate as seen in Figs. 3 and 6. On the front face of the back plate and covering the cut-away portion I mount a strip of insulating material 19. Two connectors 20 consisting of strips of metal bent to L-form are secured by screws 22 to this insulating strip, the vertical ends 20$^a$ of the connectors lying along the front face of the insulation and the tongues 20$^b$ thereof extending through holes in the insulation and through opening 80 in the back plate to engage the sockets or female connectors on the base. Screws 22 secure the connectors in position and also serve as binding posts for the ends of the wires 23, 24, respectively, leading from the thermostat contacts 11, 12 which wires extend through holes in the insulating strips and are secured beneath the heads of the respective screws. The lower ends of the vertical portions of the connectors may be turned into the insulating material as shown at 25', Fig. 2.

The sockets or female connectors which receive tongues 20^b are mounted on a raised portion 42 of the base. This raised portion of the base is formed with parallel longitudinal channels 43 for the reception of the connection sockets and an intermediate rib or ridge 44. Each socket or female connector is composed of two strips of metal, the under one 49 being formed with a loop 50 embedded in the material of the base. The lower end of the loop is turned down along the face of the base as at 56, and this strip is of sufficiently resilient material to exert a spring action on the tongue 20^b when the latter enters the socket. The socket or female connector also comprises a strip of metal 53 bent backwardly at its lower end as at 54 so that the ends of these strips together form between them a flaring entrance for the tongue 20^b. Strips 49, 53 are secured in position by screws 51 tapped into sleeves 52 embedded in the material of the base. Screws 51 also serve to bind the respective wires 46, leading to the system controlled by the thermostat, to the respective connectors on the base.

When desired, the thermometer casing, including the glass cover, frame and backing may be removed together from the base 35, it being only necessary to take out the screws 61—62 and draw the casing outward when the connectors 20 on the back will readily leave the sockets on the base, the parts of the casing being held together in the meantime by sleeves 65 and nuts 67. The casing may then be readily taken apart if desired. In the meantime the base remains on the panel or other support to which it is attached and it is unnecessary to disturb the wires 46 leading to the system controlled by the thermostat.

The exposed heat conducting element for transmitting the heat of the air surrounding the thermostat to the bulb of the latter is small and thin and therefore of small heat capacity so that it readily responds to slight changes in the temperature of the surrounding atmosphere.

Referring now to the preferred form of the invention in which is included the automatic means for closing the circuit in case the thermometer-thermostat tube is broken and which is shown in Figs. 10 to 13 inclusive, the construction is in all respects similar to that previously described, except as hereinafter mentioned. In this form of the invention, as it is specifically disclosed in the drawings, the block or strip of insulating material on the back 13' of the casing is formed of two layers 19', 19''. The contact members 20', 20', are constructed and mounted as in the previously described form of the invention except, that at their lower ends 20^d they extend through the first layer 19'' of the insulating plate and into a cross slot 90 in the back layer 19'. A cross contact member 91 is freely movable in said slot and is secured to a resilient L-shaped conducting strip 92, which in turn, is secured on the insulating strip 19' by one of the screws 22' by which the male connectors are held thereon. The pressure of the spring conductor 92 tends to force the cross contact 91 into engagement with the ends 20^d of the connectors. Normally, however, and so long as the thermostat tube is intact the cross contact 91 is held away from the terminals 20^d, 20^d by a screw 94 tapped through spring 92 and cross contact 91 and bearing upon the thermostat tube. In case the thermostat tube breaks, the pressure of the spring 92 is sufficient to carry the cross connector 91 against the terminals 20^d and short-circuit the thermostat. By suitably adjusting the screw 94 this short-circuiting device may be made operative notwithstanding any abnormality in the size or mounting of the thermostat tube.

Referring now to the form of the invention shown in Figs. 14 to 16 inclusive, it will be noted that the construction is the same as that described in connection with Figs. 1 to 9 inclusive, except in respect to the means for conducting heat between the thermometer bulb and the atmosphere surrounding the instrument. In this form of the device, the glass cover is bored and countersunk at 100 in front of the position which the bulb of the thermometer-thermostat occupies when the parts are assembled. A plug 101 of copper or other metal having high heat conductivity and with a head 102 corresponding in shape to the counter-sink extends through the bore. The inner end of the plug is formed with a tapped hole 103 to receive a screw 104 and the latter extends through a plate 105 and a sheet metal clip 106, likewise formed of highly conductive metal and having arms or prongs 107 which embrace and fit closely against the bulb of the thermometer-thermostat. The operation of this form of the device is substantially similar to that of the other forms previously described. Manifestly, if desired, the automatic cut-off disclosed in Figs. 10 to 13 inclusive may be employed in this last-described form of the invention.

It will thus be seen that I have provided a mounting in which the thermometer tube is completely enclosed and at the same time is fully visible from the front and sides. It is very sensitive to changes in temperature in the surrounding atmosphere and well protected against conduction of heat thereto from the support on which it is mounted. By reason of the resilient character of the mounting the tube is protected against shock. The instrument is readily detached from its base for exchange or repair of any of the parts, without removing the base from its support or marring the latter. In case the tube becomes broken the device is short circuited whereby the heating circuit is automatically opened.

I claim:

1. In a device of the class described, a thermometer-thermostat, a casing therefor comprising a cover and a back, a base adapted for attachment to a support, means for securing the cover and back together independently of the base, connector sockets on the base adapted for connection to the wires of the system to be controlled, connectors mounted on the back of the casing to engage the sockets on the base and wires connecting said connectors respectively with the contacts of the thermometer-thermostat.

2. In a device of the class described, a base formed on its front with recesses, the walls of the recesses being notched to permit air circulation through such recesses, a casing comprising a cover and a back, a thermometer-thermostat mounted in the casing, connector sockets on the base adapted for connection with the wires of the system to be controlled, connectors mounted on the back to engage said sockets and wires connecting said connectors respectively with the contacts of the thermometer-thermostat.

3. In a device of the class described, a thermometer-thermostat, a casing comprising a cover and a back, a base adapted for attaching to a support, and formed on its front face with recesses, the walls of the recesses being notched to permit air circulation through said recesses, seats on the base intermediate its ends, connector sockets on said seats and adapted for connection to the wires of the system to be controlled, connectors mounted on the back to engage the sockets on the base, and wires connecting said connectors respectively with contacts of the thermometer-thermostat.

4. In a device of the class described, a thermometer-thermostat, a casing comprising a cover and a back, a base adapted for attachment to a support, means for securing the cover and back together independently of the base, connector sockets on the base, each socket comprising a strip of metal bent to form an attaching portion and a loop adapted to receive a connector on the back of the casing, connectors on the back of the casing adapted to be received into the loops of the sockets on the base and wires connecting said connectors respectively with the contacts of the thermometer-thermostat.

5. In a device of the class described, a thermometer-thermostat, a casing therefor comprising a cover and a back, a base adapted for attachment to a support, means for securing the cover and back together independently of the base, connectors mounted on the back and connected to the contacts of the thermometer-thermostat respectively, said connectors each comprising a rearwardly extending tongue, sockets on the base adapted respectively to receive the said tongues and each comprising a resilient strip having a loop to receive one of said tongues and a strip of metal with an outwardly bent end overlying the loop and means for connecting said sockets with the wires of the system to be controlled.

6. In a device of the class described, a thermometer-thermostat, a casing therefor comprising a back and a hollow cover the latter open toward the back, a ring of resilient material surrounding the thermometer-thermostat and frictionally held in the hollow of the cover, and means for connecting the contacts of the thermometer-thermostat with the wiring of the system to be controlled.

7. In a device of the class described, a hollow cover of transparent material having an outwardly extending flange about its edge, a frame having an opening fitting about and through which the body of the cover projects and a rearward flange, a back fitting within said flange and substantially closing the rear opening of the cover, connectors on the back and wires connecting said connectors with the contacts of the thermometer-thermostat.

8. In a device of the class described, a hollow cover open at the back, a frame having an opening through which the hollow cover protrudes, and a rearwardly extending flange, a back fitting within the frame and substantially closing the opening of the cover, a thermometer-thermostat mounted in the cover, a heat conductor in contact with the thermostat and extending under the edge of the cover, a portion of the conductor being exposed to the atmosphere outside the casing.

9. In a device of the class described, a thermometer-thermostat, a hollow cover open at the back in which the thermostat is mounted, having outwardly extending flanges along its edges, a back substantially closing the rear opening of the cover, a frame having an opening fitting about and through which the body of the cover protrudes and a rearwardly extending flange embracing the edge of the back, a base engaged by said flange, sockets on the base and connectors on the back engaging said sockets and connected to the respective contacts of the thermostat.

10. In a device of the class described a casing comprising a cover and a back, a thermostat in the casing, connectors mounted on the back and connected to the contacts of the thermostat and adapted for connection to the system to be controlled, a spring actuated cross contact for short-circuiting the connectors and means bearing on the thermostat for normally holding the cross contact away from the connectors.

11. In a device of the character described, a casing, connectors mounted on the casing, connected to the contacts of the thermostat and adapted for connection to the system to be controlled, a bridge for short-circuiting the connectors, a spring member on which the bridge is carried, and means mounted on the bridge and bearing on the thermostat and holding the bridge away from the connectors when the thermostat is intact but permitting the bridge to engage the connectors when the thermostat is broken.

12. In a device of the class described, a thermometer-thermostat, a casing therefor, a pair of connectors mounted on the casing and connected to the respective contacts of the thermometer-thermostat, a metal spring electrically connected to one of said connectors, a bridge mounted on the spring and adapted to engage the other of said connectors, and means mounted on the spring and bearing on the thermostat to hold the bridge away from the connector when the thermostat is intact but permitting it to bridge the connectors when the thermostat is broken.

13. In a device of the class described, a thermometer-thermostat, a casing therefor, a pair of connectors mounted on the casing and connected to the respective contacts of the thermometer-thermostat, a metal spring electrically connected to one of said connectors, a bridge mounted on the spring and adapted to engage the other of said connectors, and a screw mounted on the spring and bearing on the thermostat to hold the bridge away from the connector when the thermostat is intact but permitting it to bridge the connectors when the thermostat is broken.

14. In a device of the class described, a thermometer-thermostat, a casing therefor comprising a transparent hollow cover and a back, a frame engaging the edges of the cover and back and maintaining them in fixed relation, connectors on the back connected to the contacts of the thermostat, a sleeve of heat-conducting material engaging the bulb of the thermostat, a heat-sensitive element mounted on the frame outside the casing and connected to said sleeve.

15. In a device of the class described, a thermometer-thermostat, a casing therefor, connections from the contact of the thermometer-thermostat, a contact closer in said connection comprising a member bearing on the thermometer-thermostat and means acting on said contact closer for closing the same when the thermometer-thermostat is broken.

In testimony whereof, I have subscribed my name.

WILLIAM G. HARTWIG.